United States Patent [19]
Small

[11] 3,907,102
[45] Sept. 23, 1975

[54] APPARATUS AND PROCESS FOR FORMING TUBULAR BODIES

[76] Inventor: Bernard J. Small, 8343 S. Winchester Ave., Chicago, Ill. 60620

[22] Filed: Sept. 4, 1974

[21] Appl. No.: 503,120

Related U.S. Application Data

[60] Continuation of Ser. No. 401,859, Sept. 28, 1973, abandoned, which is a division of Ser. No. 195,162, Nov. 3, 1971, Pat. No. 3,772,752, which is a division of Ser. No. 848,512, Aug. 8, 1969, Pat. No. 3,646,657.

[52] U.S. Cl. ................................ 198/285; 198/282
[51] Int. Cl.² ........................................ B65G 47/24
[58] Field of Search ............ 198/267, 282, 283, 285

[56] References Cited
UNITED STATES PATENTS
1,053,391   2/1913   Hilke .................................. 198/154
3,499,555   3/1970   Wahle ................................ 198/154

*Primary Examiner*—Evon C. Blunk
*Assistant Examiner*—Joseph E. Valenza

[57] ABSTRACT

Conveyor apparatus for connecting stages in a fabricating system carrying a plurality of spaced support members and being adapted to move individual articles being fabricated from one support member to the next adjacent support member, a member protruding into the path of movement for engaging the article when it is being moved from one support member to the next support member for reorienting the positional relationship of the article between the inlet and the outlet of the conveyor.

2 Claims, 5 Drawing Figures

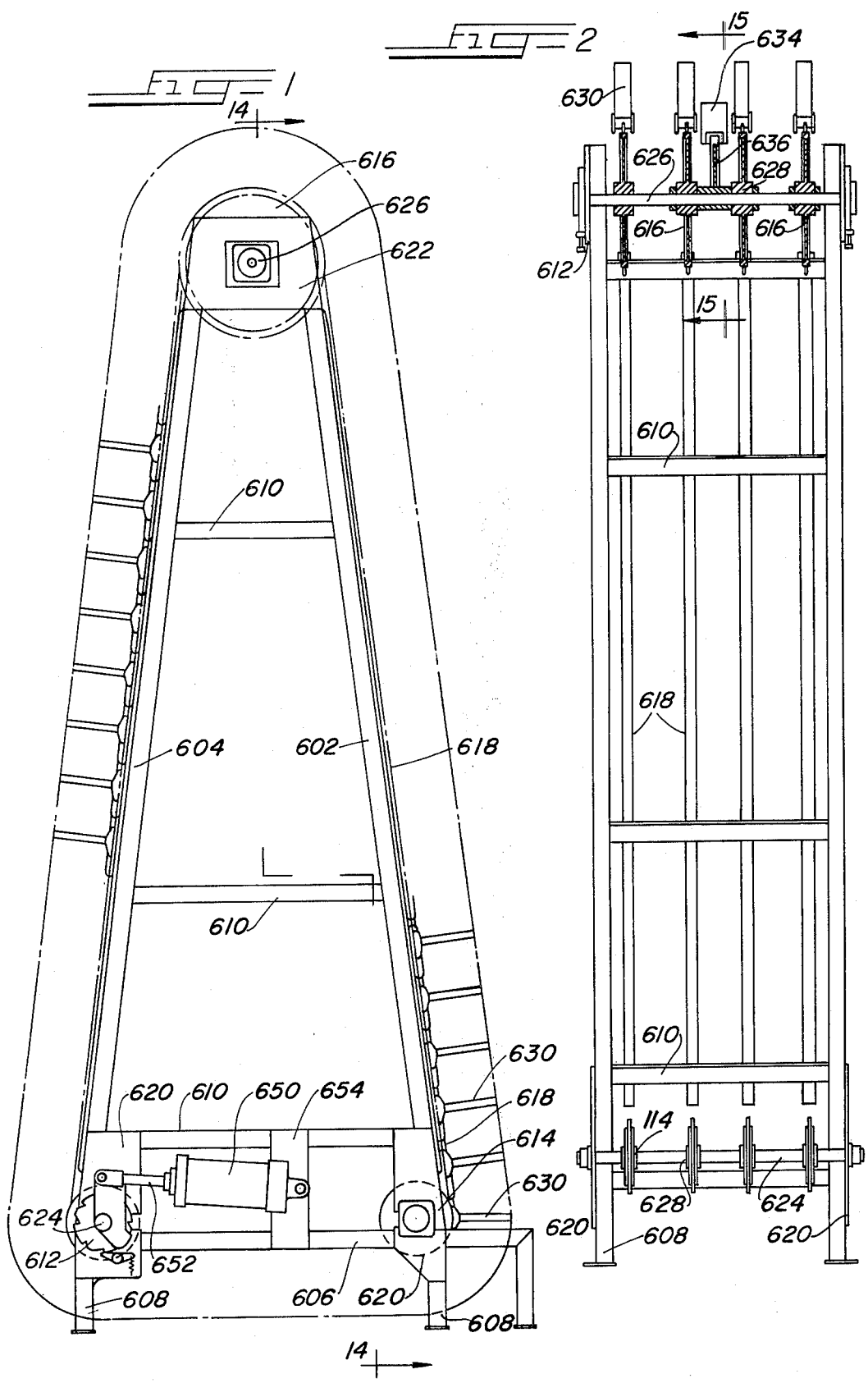

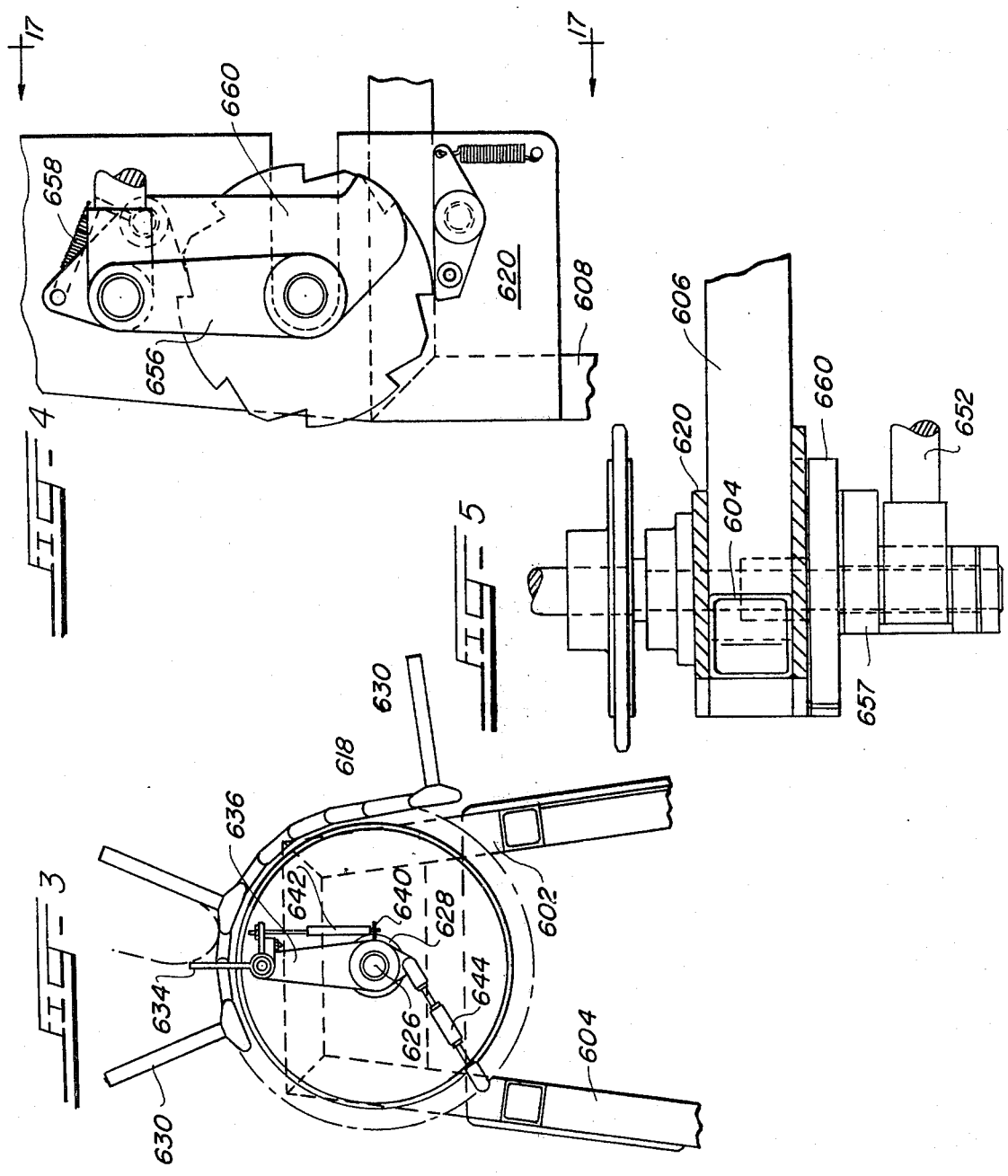

APPARATUS AND PROCESS FOR FORMING TUBULAR BODIES

This application is a continuation of application Ser. No. 401,859, filed Sept. 28, 1973 now abandoned, entitled "Apparatus and Process for Forming Tubular Bodies," which is a division of applicant's application, Ser. No. 195,162, filed Nov. 3, 1971, now U.S. Pat. No. 3,772,752, entitled "Apparatus and Process for Forming Tubular Bodies," and the latter application is a division of applicant's application, Ser. No. 848,512, filed Aug. 8, 1969, entitled "Apparatus and Process for Forming Tubular Bodies," now U.S. Pat. No. 3,646,657, issued Mar. 7, 1972.

The invention also contemplates the provision of a novel accumulator conveyor which transports, upon controlled need of the system, articles such as mufflers in stages of completion between various assembly and operative stations of the overall system. The conveyor allows for the accumulation between stations of the partially completed mufflers to allow for an increase in the rate of production of the overall system. The conveyor allows for the accumulation between stations of the partially completed mufflers to allow for an increase in the rate of production of the overall system to approximately 360 mufflers per hour. In this connection the conveyor path is significantly lengthened from the otherwise straight path between stations. Additionally, stock inventory may be introduced to the conveyor for delivery to following stations during periods of partial shut-down. Further still, the conveyor includes means whereby the seamed muffler, introduced to the conveyor in one position, may be reoriented during transit to a second position thereby to be properly aligned for further processing.

There have thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit of the scope of the invention.

A specific application of the invention has been chosen for purpose of illustration and description, and is shown in the accompanying drawings forming a part of the specification, wherein:

FIG. 1 is a side elevation of the accumulator conveyor;

FIG. 2 is a vertical section as seem along the line 14—14 in FIG. 1;

FIG. 3 is a vertical section as seen along the line 15—15 in FIG. 2;

FIG. 4 is an enlarged view of the drive means for the accumulator conveyor;

FIG. 5 is a front elevation of the drive means as seen along the line 17—17 in FIG. 4.

The accumulator conveyor 600 may best be seen in FIGS. 1 to 3. The conveyor is in the form of a tower formed by pairs of generally inclined legs 602 and 604 integrally or otherwise connected at the top in a trapezoidal arrangement. The bottom positions of the legs are supported on a stand 606 including legs 608 thereby to elevate the frame in relation to the ground. Spaced along the length of the legs are a plurality of horizontal braces 610 to provide necessary support for the structure.

The conveyor includes a plurality of gear wheels 612 and 614 carried at the base of tower and gear wheels 616 carried at the top of the tower in a triangular disposition. In the figures each plurality includes four gear wheels thereby to drive a like number of conveyor chains 618. Any particular number of conveyor chains, as desired, may be employed for proper support of the mufflers to be carried from stage to stage.

Opposed bracket plates 620 are mounted by each of the frame legs, the stand and horizontal braces whereas a bracket plate pair 622 is carried within the upper trapezoidal region of the frame. Each bracket pair 620 supported therebetween a shaft 624 while the bracket pair 622 supports therebetween the shaft 626. Each shaft is journalled for rotation and each shaft, by means of the hubs 628 keyed thereto, stationarily supports the several gear wheels for intermittent movement in response to system operation. Driving motion is imparted to the conveyor through an air powered ratchet arrangement as clearly illustrated in FIGS. 4 and 5.

The accumulator conveyor is disposed at the output of the wrapper-seamer thereby to receive for transport mufflers 50 in a stage of partial completion. In this connection the mufflers exiting the chute 462 are received in individual pockets formed by rest bars 630 carried by the conveyor chains. Thus, in all, each muffler is supported during movement by four rest bars spanning the width of the tower as illustrated in FIG. 2.

In operation, the muffler received by the first accumulator conveyor is disposed with the seam 52 directed away from the longitudinal axis of the tower. However, the muffler must be reoriented prior to receipt by the end flanger 700 for proper operation. Therefore, an important feature of the invention is the structure for reorienting the muffler during transit between stages. This structure is shown in FIG. 3.

The reorienting structure is composed of a paddle 634 which is mounted by the shaft 626 between the center gear wheels so as to project into the path of movement of a muffler as it moves clockwise as in FIG. 3. The paddle is pivotally mounted by an arm 636 which, in turn, is mounted on the shaft 626. The paddle and the arm carry projections 638 and 640, respectively, and an adjustment member 642 is mounted on each projection. By adjustment of the member 642 the disposition of the paddle in relation to the arm may be affected. Similarly, by adjustment of a second member 644 the disposition of the arm in relation to the tower legs may be affected. In short by proper adjustment of both the members 642 and 644 proper movement of the muffler may be obtained as the chain conveyor moves during stepped drive.

In FIG. 3 the muffler is shown in the reoriented position. In this connection the muffler upon delivery to the conveyor was disposed with the seam 52 (shown by the bead at the base of the muffler) in the outward direction. However, during movement and through the intercooperation of the paddle 634 and upon movement of the rest bars 630 the muffler pivots about the paddle end into the seam inward direction.

The drive for the accumulator conveyor may best be seen in FIGS. 4 and 5.

The drive is provided by an air powered ratchet for direct drive of the shaft 624 and gear wheels 612. In this connection an air cylinder 650 including a piston rod 652 is pivotally mounted on a vertical support member 654 carried between horizontal support members 606 and 610 (see FIG. 1). The rod at the other end, is pivotally mounted on the arm 656 for movement of the arm about the shaft 624. The arm 656 upon reciprocation of the piston rod moves the member 657 with the arm. The member is connected to the ratchet 660 and the gear wheel 612 by a heavy spring 658 which causes the ratchet to follow arm movement to a stop determined by the rotational position of the member 657.

The accumulator conveyor provides a chute 702 including a plurality of bottom support elements appropriately spaced to allow passage of the rest bars 630. In this manner the muffler so will, during movement, follow the chute and move toward the next stage of the system.

Having described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed as new and desired to be accured by Letters Patent is:

1. In an automatic system for fabricating automotive mufflers an apparatus for transporting a partially completed muffler along an elongated path between adjacent stages of said system comprising an endless conveyor, means for driving said conveyor in a step-by-step manner in response to system demands and in synchronism to movement of said partially completed muffler through said system, a plurality of spaced support means carried by said conveyor for supporting said partially completed muffler during passage between an inlet and an outlet, said support means being carried by said conveyor in a manner such that upon movement of the conveyor one of said support means is positioned to receive at said inlet said partially completed muffler from an immediately preceding stage, means in said conveyor path for moving said partially completed muffler from one of said support means to the next adjacent support means, a member protruding into the path of movement for engaging said partially completed muffler when moving said partially completed muffler from said one support means to the next adjacent support means for reorienting said partially completed muffler from a position at the inlet to a second position, and outlet means for passing said reoriented muffler to a following stage of said system.

2. An apparatus for use in a fabricating system comprising an endless conveyor connecting stages of the system and for conveying partially fabricated articles between said stages throughout an elongated path which is greater than the distance between said stages, means for driving said conveyor in response to system demands and in synchronism to movement of said partially completed article through said system, a plurality of spaced support means carried by said conveyor for supporting said articles throughout movement in the elongated path between an article inlet and an article outlet, means in said conveyor path for moving said partially completed article from one of said support means to the next adjacent support means, a pivotally mounted paddle member protruding into the path of movement for engaging said partially completed article when moving said partially completed article from said one support means to the next adjacent support means for reorienting said partially completed article, means for adjusting the positional relationship of said paddle member with respect to the partially completed article to control the reorientation of said article, said support means being mounted by the conveyor in a manner such that upon movement of the conveyor said support means is positioned to receive said article from an immediately preceding stage, and outlet means for passing said reoriented article to a following stage of said system.

* * * * *